(12) United States Patent
Whisenant

(10) Patent No.: US 6,305,798 B1
(45) Date of Patent: Oct. 23, 2001

(54) EYEGLASSES FRAME WITH INTEGRAL HINGE REPAIR KIT

(76) Inventor: Tony L. Whisenant, 3239 S. Lightning Dr., Tucson, AZ (US) 85708

( * ) Notice: Subject to any disclaimer, the term of this patent is extended or adjusted under 35 U.S.C. 154(b) by 0 days.

(21) Appl. No.: 08/016,148

(22) Filed: Feb. 5, 1993

(51) Int. Cl.$^7$ ........................................................ G02C 5/14
(52) U.S. Cl. ................................................ 351/111; 351/119
(58) Field of Search ................................ 251/42, 111, 116, 251/118, 119, 158

(56) References Cited

U.S. PATENT DOCUMENTS

| | | | |
|---|---|---|---|
| 3,510,208 | | 5/1970 | Watkins . |
| 3,612,668 | | 10/1971 | Watkins . |
| 4,012,130 | * | 3/1977 | Guillet ................................. 351/119 |
| 4,153,348 | * | 5/1979 | Walters et al. ........................ 351/119 |
| 4,787,728 | * | 11/1988 | Anger ................................... 351/119 |
| 5,007,728 | * | 4/1991 | Magorien .............................. 351/119 |
| 5,185,620 | * | 2/1993 | Cooper ................................. 351/111 |
| 5,223,861 | * | 6/1993 | Wagner ................................. 351/119 |

FOREIGN PATENT DOCUMENTS

1358532 * 3/1964 (FR) .................................... 351/118

* cited by examiner

*Primary Examiner*—Charles G. Freay
(74) *Attorney, Agent, or Firm*—Antonio R. Durando

(57) ABSTRACT

An eyeglasses frame that accommodates within the core of its temple arms a tool and fasteners which together can be used to repair the hinge of the frame. Each temple arm consists of a front section hingedly attached to the rim and a rear section that together form a conventionally shaped temple arm. The rear section of one of the temple arms comprises a jeweler screwdriver's blade protruding forward along the longitudinal axis of the arm; while the front section comprises a conforming longitudinal opening for receiving the screwdriver's blade when the two sections are assembled together. Appropriate fastening means ensure that the temple arm so assembled is rigid at the point of connection, so as to maintain the functional shape of the arm during use. The front section of the other arm comprises an opening wherein hinge screws or pins are stored; and the corresponding rear section is connected to the front section by the same type of fastening means used for the other arm.

13 Claims, 3 Drawing Sheets

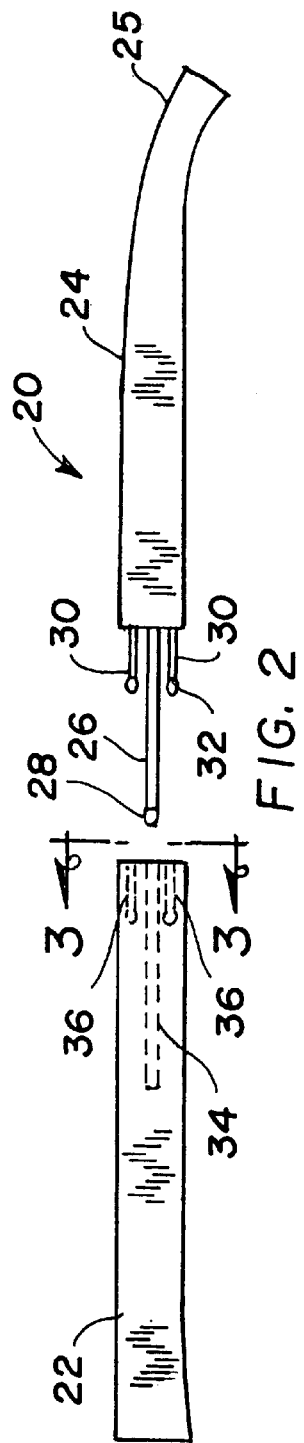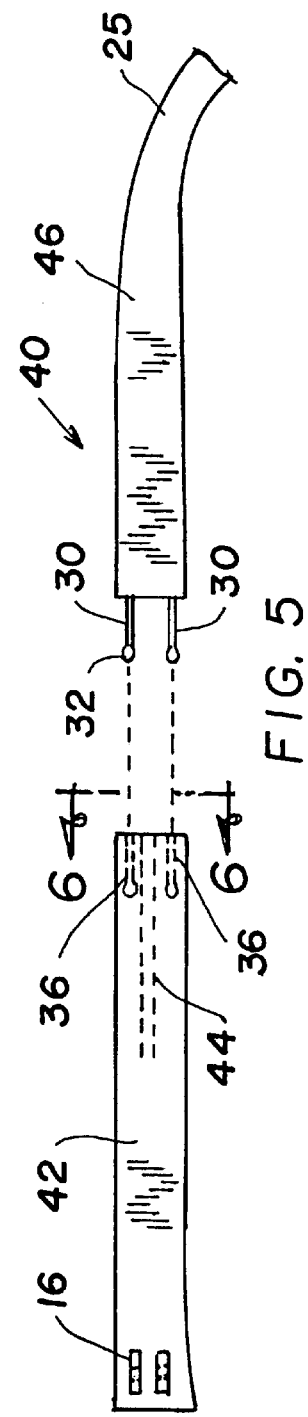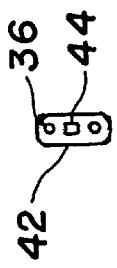

EYEGLASSES FRAME WITH INTEGRAL HINGE REPAIR KIT

RELATED DOCUMENTS

This invention is based on Disclosure Document No. 294008, submitted to the U.S. Patent and Trademark Office on Oct. 25, 1991.

BACKGROUND OF THE INVENTION

1. Field of the Invention

This invention is related in general to the field of frames for eyeglasses and, in particular, to a frame of this type accommodating within the core of its temple arms a device and fasteners that together can be used to repair the hinge of the frame.

2. Description of the Prior Art

The frame of eyeglasses or spectacles typically consists of a front rim which is formed to hold a lens for each eye and of two temple arms which are attached to the two outer sides of the rim. Each temple arm is long enough so that, when the front rim is positioned with the lenses in front of the eyes, the temple arm will rest on top of the ear where the ear meets the head. In order to keep the frame in place while the eyeglasses are being worn, each temple arm is further shaped with a curved or bent end piece that fits around the ear close to the head. Each temple arm is normally attached to the front by a hinged connection that allows the temple arm to swing approximately 90 degrees from its open position to a folded position against the front rim, providing a fairly flat and more compact shape for easy and convenient storage of the eyeglasses. Such hinged connection comprises a screw or pin that provides the axle of rotation of the temple arm.

The regular swinging of the temple arms as the frame is folded, unfolded and refolded, as well as the normal use and sometime misuse of eyeglasses, puts a strain on the hinged connection that during the lifetime of the eyeglasses will with some regularity result in the hinge screws or pins coming loose and possibly falling out. Taking the broken frames to a jewelry shop for repair or adjustment requires a time diversion that is normally very inconvenient. Alternatively, a user can do the job herself since the repair is relatively simple to perform. However, a repair kit with a tool small enough to accomplish the job and the correct size screw or pin is required. Furthermore, since the repair kit is inconvenient to carry and eyeglasses frames never seem to break when a repair kit is available, a wearer will usually be forced to attempt a "make-shift" repair with a paper clip or rubber band or suffer with one-templed glasses until he can get to his repair kit. Moreover, too often a hinge screw is lost and the kit does not contain the correct size screw.

Portable kits, containing frame screws and jeweler's screwdrivers, have been available for some time, but they consist of a separate item that has to be carried around in addition to the eyeglasses. Thus, the availability of the kit is dependent upon a user remembering to carry it along. No eyeglasses exist that incorporate such a kit within the frame of the glasses.

In U.S. Pat. No. 3,510,208 (1970) and U.S. Pat. No. 3,612,668 (1971), Watkins shows an eyeglasses frame with extensible temple arms. The extension is achieved by telescopically interconnecting arm sections that can be adjusted to create the correct length for different wearers. Different means of fastening and adjusting the various sections are presented, but no hint is given about the possibility of using a similar concept to incorporate a jeweler's screwdriver kit in the frame of the glasses.

Therefore, there is a need for a repair kit that is always available to a user without requiring a separate item to be carried with the eyeglasses. The present invention solves these problems by providing a frame that incorporates a screwdriver and houses the correct screws within the frame itself, thus permitting a user to replace or tighten the frame hinge as needed and without delay.

BRIEF SUMMARY OF THE INVENTION

One objective of this invention is a device to adjust and repair the hinge that connects each temple arm to the front rim of the frame of eyeglasses.

Another objective of the invention is a device in the form of a kit that is incorporated entirely within the structure of the eyeglasses frame, so that it is always available when needed.

A further goal is a kit that also includes pins or screws for the particular hinges of the eyeglasses frame that incorporates it, so that a replacement part is immediately available when a temple arm comes apart.

Still another objective of the invention is an eyeglasses frame repair device that is easy and simple for even the unskilled person to use successfully.

A final objective is the easy and economical manufacture of the device according to the above stated criteria. This is achieved by using commercially available components and materials, modified only to the extent necessary to fit the requirements of the invention.

Therefore, according to these and other objectives, the present invention is an eyeglasses frame that accommodates within the core of its temple arms a tool and fasteners which together can be used to repair the hinge of the frame. Each temple arm consists of a front section hingedly attached to the rim and a rear section that together form a conventionally shaped temple arm. The rear section of one of the temple arms comprises a jeweler screwdriver's blade protruding forward along the longitudinal axis of the arm; while the front section comprises a conforming longitudinal opening for receiving the screwdriver's blade when the two sections are assembled together. Appropriate fastening means ensure that the temple arm so assembled is rigid at the point of connection, so as to maintain the functional shape of the arm during use. The front section of the other arm comprises an opening wherein hinge screws or pins are stored; and the corresponding rear section is connected to the front section by the same type of fastening means used for the other arm.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 2 is a side elevational view of the components constituting a first temple arm according to the preferred embodiment of the present invention.

FIG. 5 is a side elevational view of the components constituting a second temple arm according to the preferred embodiment of the present invention.

FIG. 6 is an end view of the front section of the temple arm shown in FIG. 5, as seen from line 6—6 in that figure.

DETAILED DESCRIPTION OF THE INVENTION

The heart of this invention is in the idea of incorporating a jeweler-type kit within a conventional eyeglasses frame, so that it is promptly available when needed. This disclosure describes a way to implement such an idea within the limited space available and within the requirement that the integrity of frame's structure be maintained.

Figure 1:
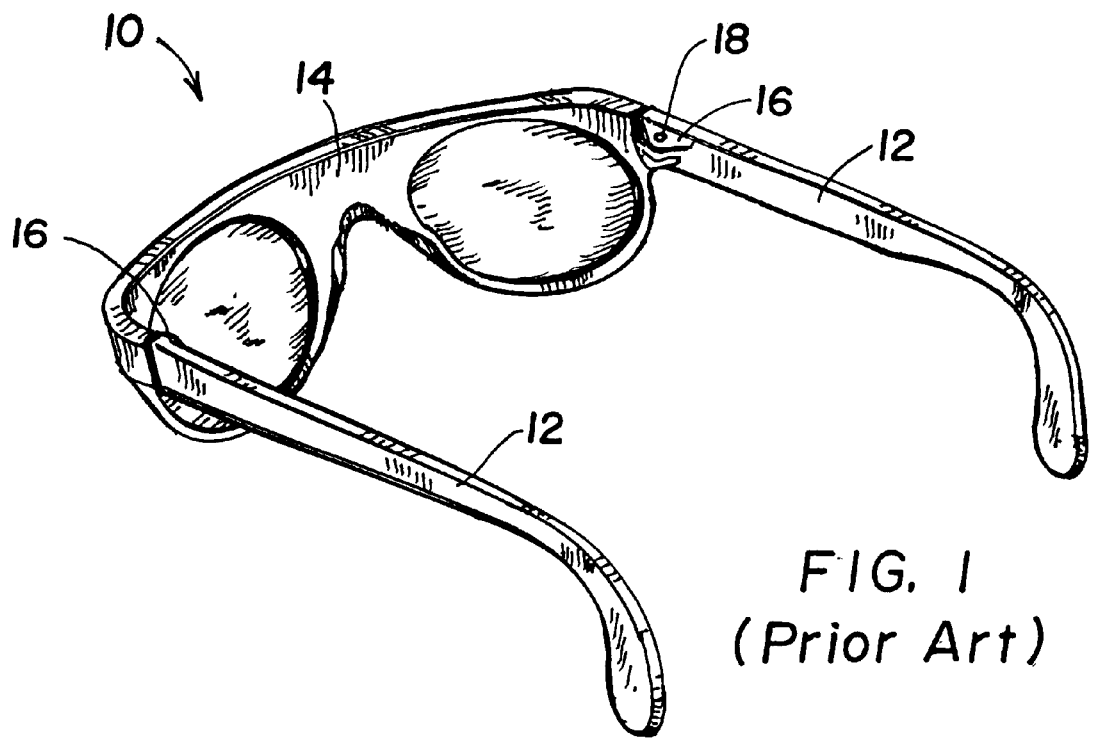
FIG. 1 is a perspective view of a conventional pair of eyeglasses showing hinged temple arms in an open position.

Referring to the drawings, wherein like parts are designated throughout with like numerals and symbols, FIG. 1 illustrates a pair of conventional eyeglasses 10 having temple arms 12 hingedly connected to a front rim 14. Each hinge 16 consists of a small horizontal plate (or parallel plates) attached to the rim and a comparably sized and shaped plate (or parallel plates) attached to the front end of the temple arm, and of a substantially vertical screw or pin 18 that connects the two enmeshed plates (or sets of plates) and forms a hinge by providing an axle around which the plates can slide. As mentioned above, the repetitive opening and closing of the temple arms cause the screws 18 to become loose, necessitating periodic tightening. If not tightened when loose, a screw may fall off and become lost, necessitating replacement with a screw of the same size.

FIG. 2 illustrates in elevational side view one embodiment of a sectioned temple arm 20 according to this invention (shown as the left temple arm for illustration purposes only), wherein a conventional temple arm is divided into a front section 22 and a separate rear section 24 with an ear piece 25 curved downward. Keeping in mind the spatial requirements of the invention, as will become apparent from the following description, the point of division between the two sections should be selected where the stress along the length of the arm is minimum during use. For typical glasses, subjected to normal lateral forces exerted by the hinges and the ear pieces, it is believed that front and rear sections of approximately equal length are adequate.

The front end of the rear section comprises a small, jeweler-type screwdriver blade 26 rigidly connected thereto and protruding forward along the longitudinal axis of the arm. The tip 28 of the blade 26 is shaped to conform to the type of screw 18 used to form the hinges 16 of the frame; that is, it may be a cabinet, keystone, phillips head, or other tip, depending on the head of the screw 18. The front end of the rear section of the temple arm also comprises a set of rigid guide pins 30, each having a rounded tip 32 of cross-section slightly larger than that of the guide pin. The guide pins 30 also protrude forward and are disposed in parallel to the screwdriver blade 26.

Figure 3:
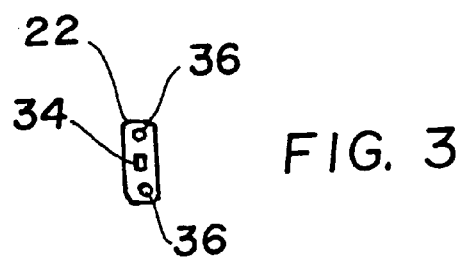
FIG. 3 is an end view of the front section of the temple arm shown in FIG. 2, as seen from line 3—3 in that figure.
Figure 4:
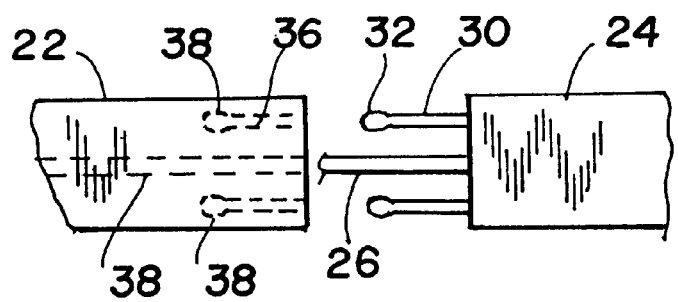
FIG. 4 is an enlarged, partial view of the rear end of the front section and the front end of the rear section of the temple arm illustrated in FIG. 2.

The rear end of the front section 22 of the temple arm 20 comprises a longitudinal sheath 34 along the axis of the arm conforming in length and diameter to the size of the screwdriver's blade 26, so that the entire blade may be introduced and snugly housed into the sheath 34. Thus, the front and rear sections may be assembled to constitute a conventional temple arm having an operational screwdriver stored inside. In addition, as also seen in the end view of FIG. 3 and the enlarged partial side-view of FIG. 4, two parallel slots 36 are provided to receive the guide pins 30. The length and size of the slots 36 are adapted to completely conform to the geometry of the guide pins 30, including a cavity 38 at the inner end of each slot to house the rounded tip 32. That is, the cross-section of each slot 36 is smaller than that of the rounded tip 32, while the cross-section of the cavity 38 is larger than the tip 32. As a result, the deformation (by compression) of the tips 32 (or the slots, or both) is required to introduce the guide pins into the slots and the subsequent expansion of the tips 32 in the cavities 38 provides a locking mechanism for holding the front and rear sections of the temple arm together.

Obviously, the locking mechanism so provided requires that at least one of the components be made with a material having some resilience. If the frame is made with plastic and the guide pins are made with metal, which is preferable for strength and rigidity, the normal resilience of the plastic will be sufficient to permit the sliding of the guide pins into the slots and the interlocking of the tips with the cavities at the ends thereof.

Even if both components are made of metal, though, and the resilience of the material is small, the guide pin 30 and the slot 36 may be made to function as an interlocking mechanism by sizing the tip 38 so that is fits snugly within the slot, so that a certain amount of force is required to couple the two. The alignment of the guide pins 30 with the slots 36 ensures that the rear section 24 is also properly aligned with the front section 22 at all times. Moreover, rigidity and alignment of the assembled temple arm is further provided by the screwdriver's blade inserted into the receiving sheath 34. Therefore, even though two guide pins are shown in the figures, a single one may be sufficient to practice the invention.

In the preferred embodiment of the invention, the second temple arm 40 also consists of two separate sections, as illustrated in elevational side view in FIG. 5 (showing a right temple arm for illustration purposes only). The front section 42 comprises a hollow interior compartment 44 open toward the rear end of the section (see also FIG. 6) and substantially coaxial with the temple arm. The hollow compartment 44 provides a convenient storage area for spare hinge screws 18, which may be safely encapsulated within the temple arm until needed. Longitudinal slots 36 in the front section 42 and corresponding guide pins 30 in the rear section 46 are provided to permit the rigid assembly and interlocking of the two components as described above for the other temple arm.

Obviously, the construction of the slots and guide pins must be accomplished within strict size tolerances to ensure a good fit of the two sections, to provide a complete closure of the hollow compartment 44, and to form a rigid temple arm that is functionally equivalent to a single-piece structure. The locking mechanism could be constructed in equivalent fashion by placing the guide pins 30 on the front section and the receiving slots 36 in the rear section. Therefore, while the screwdriver blade 26 must necessarily be attached to the rear section of the temple arm (so that it can be freed for use on the hinge 16), the locking mechanism components 30 and 36 and the hollow storage compartment 44 can be either in the front or the rear section of the temple arm, as would be obvious to one skilled in the art.

Figure 7:
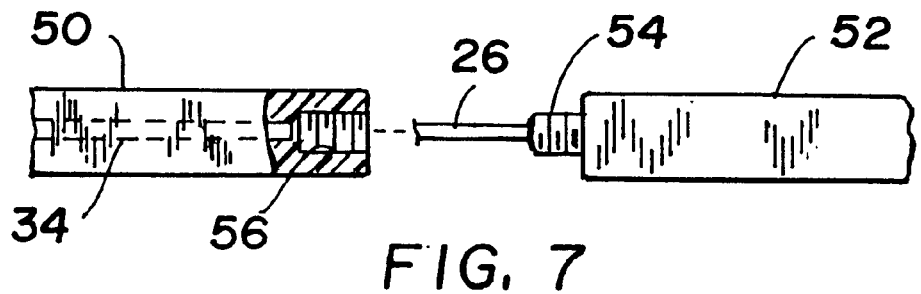
FIG. 7 is a partially cut-out side view of the rear end of the front section and the front end of the rear section of the first temple arm of the invention according to another embodiment of the locking mechanism.
Figure 8:
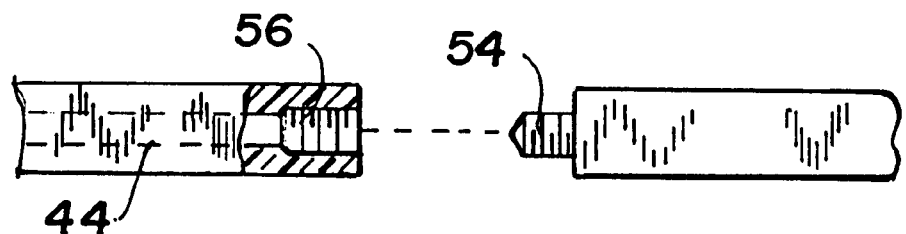
FIG. 8 is a partially cut-out side view of the rear end of the front section and the front end of the rear section of the second temple arm of the invention utilizing the same locking mechanism of FIG. 7.

According to another embodiment of the invention shown in FIG. 7, the locking mechanism between the front and rear sections (shown as 50 and 52, respectively) consists of a threaded male connector 54 attached to the front end of the rear section and enveloping the blade 26 of the screwdriver. Correspondingly, a threaded female connector 56 is incorporated in the rear end of the front section 50 for cooperative engagement with the male connector 54 to form a single-piece temple arm. Except for the larger opening created by the female connector 56, the longitudinal sheath 34 for housing the blade and tip of the screwdriver remains as described for the first embodiment of the invention. As shown in FIG. 8, this threaded connection can be similarly utilized for the other temple arm, which comprises the hollow interior compartment 44 for storing spare screws. In order to ensure the correct alignment and position of the ear piece 25 when the threaded connectors are tight, it is recommended that single-groove threads requiring a precise number of turns to completely screw one section into the other be utilized. Thus, the threads can be engaged only in a way that results in the correct position of the ear piece after assembly. Also, as in the case of the preferred embodiment, the threaded connectors and the hollow compartment 44 for the temple arm shown in FIG. 8 can be placed on either the rear or the front section in equivalent manner.

In the preferred embodiment of the invention the screwdriver blade is approximately 40 mm long and has a cross-section with a diameter of about 1 mm. The storage compartment 44 is at least 5 mm deep and has a cross-section of about 4 mm$^2$, so that a number of screws can be easily stored in it. Guide pins approximately 10 mm long have been found to provide sufficient coupling and strength to the temple arm. In addition, in order to facilitate the manipulation of the small hinge screws as they are being fitted and turned into the hinges of the frame, it is anticipated that the tip 28 of the screwdriver would be magnetized, as is often done with regular tools. Alternatively, screws equipped with a plastic sheath guide may be used.

In operation, the eyeglasses frame of the invention is assembled by storing at least one hinge screw 18 in the hollow compartment 44 and by coupling the rear section of each temple arm with the corresponding front section. In the first embodiment, the guide pins 30 are aligned with and pushed through the slots 36 until the rounded tips 32 snap in position within the receiving cavities 38. In the second embodiment, the rear sections are screwed onto the front sections by engaging the threads of the connectors and turning them until snug, at which point the ear pieces should be positioned downward for use over a wearer's ear. When needed either to tighten a hinge screw or replace a lost one, the temple arms can be taken apart readily providing the necessary tools to make the repair. Upon reassembly, the frame is ready for use again, without delay or excessive inconvenience.

Figure 9:
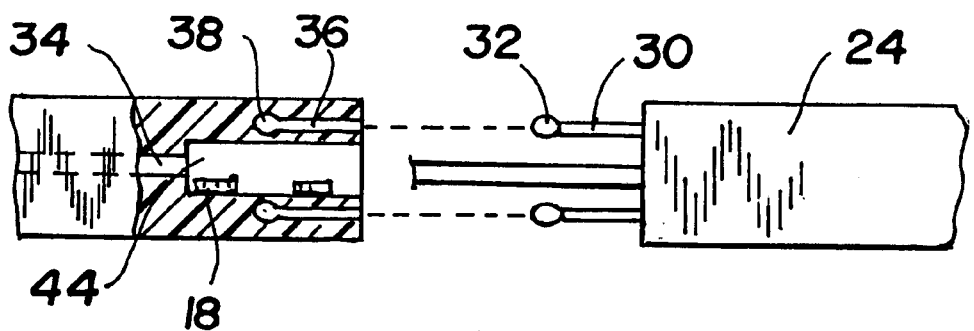
FIG. 9 is an enlarged, partially cut-out view of the rear end of the front section and the front end of the rear section of a temple arm according to this invention incorporating both a screwdriver and a storage compartment in the same arm.

While the embodiments shown in the figures feature the specific characteristics and shapes therein described, the invention can obviously take other shapes with equivalent functionality and utility. In fact, any shape for any of the components that retains the functional characteristics described above provides an acceptable apparatus to practice the invention. For example, a smaller storage compartment 44 could be combined coaxially with the sheath 34 in a single temple arm, as illustrated in the enlarged partial view of FIG. 9, obviating the necessity to have two sectioned temple arms. Thus, the other temple arm would not need to be sectioned. Similarly, a variety of other components that are not essential to the functioning of the invention could be introduced by one skilled in the art to fit the needs of specific applications, such as additional or longer guide pins and corresponding receiving cavities to add rigidity to the assembled temple arms.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus and methods.

I claim:

1. An eyeglasses frame incorporating a hinge repair kit, comprising:
   (a) a front rim;
   (b) a first temple arm comprising a first front section including a longitudinal sheath and a first rear section including a longitudinal screwdriver blade adapted for insertion into said sheath, wherein said first front section is hingedly connected to said front rim by means of a first substantially vertical hinge screw, and wherein said screwdriver blade contains a tip adapted for use with said hinge screw;
   (c) a second temple arm comprising a second front section including a longitudinal storage compartment and a second rear section, wherein said second front section is hingedly connected to said front rim by means of a second substantially vertical hinge screw; and
   (d) means for rigidly coupling said front section to said rear section of the first and second temple arms.

2. The frame of claim 1, further comprising
   at least one hinge screw stored in said storage compartment.

3. The frame of claim 1, wherein said means for rigidly coupling said front section to said rear section of the first and second temple arms consists of at least one guide pin protruding longitudinally from one of said front and rear sections and a corresponding receiving slot in the other of said front and rear sections, said guide pin and slot being capable of interlocking to provide a rigid connection between the sections.

4. The frame of claim 3, wherein said guide pin further comprises an enlarged rounded tip and said slot further comprises a cavity for receiving said rounded tip.

5. The frame of claim 1, wherein said means for rigidly coupling said front section to said rear section of the first and second temple arms consists of a male connector protruding longitudinally from one of said front and rear sections and a corresponding female connector encased in the other of said front and rear sections, said connectors being capable of interlocking to provide a rigid connection between the sections.

6. The frame of claim 1, wherein said screwdriver blade tip is magnetized.

7. An eyeglasses frame incorporating a hinge repair kit, comprising:
(a) a front rim;
(b) a first temple arm comprising a front section including a longitudinal sheath and a coaxial storage compartment, and comprising a rear section including a longitudinal screwdriver blade adapted for insertion into said sheath, wherein said front section is hingedly connected to said front rim by means of a first substantially vertical hinge screw, and wherein said screwdriver blade contains a tip adapted for use with said hinge screw;
(c) a second temple arm hingedly connected to said front rim by means of a second substantially vertical hinge screw; and
(d) means for rigidly coupling said front section to said rear section of the first temple arm.

8. The frame of claim 7, further comprising
at least one hinge screw stored in said storage compartment.

9. The frame of claim 7, wherein said means for rigidly coupling said front section to said rear section of the first temple arm consists of at least one guide pin protruding longitudinally from one of said front and rear sections and a corresponding receiving slot in the other of said front and rear sections, said guide pin and slot being capable of interlocking to provide a rigid connection between the sections.

10. The frame of claim 9, wherein said guide pin further comprises an enlarged rounded tip and said slot further comprises a cavity for receiving said rounded tip.

11. The frame of claim 7, wherein said means for rigidly coupling said front section to said rear section of the first temple arm consists of a male connector protruding longitudinally from one of said front and rear sections and a corresponding female connector encased in the other of said front and rear sections, said connectors being capable of interlocking to provide a rigid connection between the sections.

12. The frame of claim 7, wherein said screwdriver blade tip is magnetized.

13. An eyeglass frame, the eyeglass frame including a rim first distal end and a rim second distal end, the rim first distal end mounting a first hinge, the rim second distal end mounting a second hinge, a first temple arm hingedly mounted to the first hinge, a second temple arm hingedly mounted to the second hinge, and the first temple arm including a planar front section with a rear end, and including a rear section selectively securable to the front section's rear end, the rear section including a planar forward end arranged for complementary and contiguous communication with the rear end of the front section, and the rear section including a threaded rod fixedly mounted to the forward end of the rear section, and the threaded rod including a screwdriver blade mounted at a free distal end of the threaded rod spaced from the forward end of the rear section, and the front section of the temple arm including a threaded bore directed into the front section from the rear end thereof, and the threaded rod and the screwdriver blade threadedly received within the threaded bore in the rear end of the front section.

* * * * *